Patented Dec. 19, 1944

2,365,245

UNITED STATES PATENT OFFICE 2,365,245

INSECTICIDE

Wesley G. Bruce, Dallas, Tex., dedicated to the free use of the People in the Territory of the United States No Drawing. Application September 25, 1941, Serial No. 412,221

1 Claim. (Cl. 167—14)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention is concerned with insecticides, and its primary object is to provide a harmless, yet effective, substance for the internal medication of domestic animals. My invention consists of the oral administration to livestock of a common chemical for a novel and hitherto unknown purpose, more specifically for the control of horn flies (Haematobia irritans L.) in the feces of such medicated animals.

The horn fly is one of the important insect pests attacking cattle in the United States. These flies breed exclusively in cattle droppings, i. e., the eggs of the horn fly are deposited only on fresh cattle droppings and the horn fly larvae develop only in such media. Therefore, any substance which can be mixed with the cattle feed, or otherwise administered orally, and which will pass on out of the animal in the droppings, and render the droppings toxic to horn fly larvae will effect horn fly control. Obviously such a substance must be non-toxic to the animal. Such a substance may also inhibit the development of other undesirable manure-inhabiting insects as houseflies (Musca domestica), stable flies (Stomoxys calcitrans), etc. Furthermore, since the substance is so toxic to horn fly larvae, it may also be toxic to certain gastro-intestinal parasites, such as ascarids and nodular worms in swine, the various stomach worms and intestinal worms of sheep, stomach worms and nodular worms of cattle, strongyles in horses, and various other worms in these and other animals. It would, therefore, be considered as an anthelmintic for livestock.

I have discovered that zinc oxide is a powerful larvicide for horn fly larvae. It also may be used as an anthelmintic, and as a parasiticide. Zinc oxide (ZnO) is a very fine, odorless, tasteless, amorphous, white or yellowish-white powder. According to the Dispensatory of the United States of America (22nd edition), "Zinc oxide has been used as an antispasmodic in chorea, epilepsy and whooping cough . . . It is also sometimes employed for its astringent and sedative properties in diarrhea. Its most important use, however, is as an application to excoriated surfaces and in various skin diseases. It owes its popularity to a combination of four qualities: It is non-toxic, protective, mildly astringent and probably antiseptic."

The advantages realized by using zinc oxide for internal medication include effective larvicidal properties against such insects as horn flies without toxicity to the animal. Furthermore, this compound is perfectly safe for man to handle.

In tests with zinc oxide for internal medication the chemical was mixed with bran and fed to cattle. In daily doses of 3 grams of zinc oxide per hundredweight of the animal, no horn fly larvae dveloped in the droppings after the second dose. The daily administration of 2 grams zinc oxide per hundredweight inhibited larval development starting about 48 hours after the first medication. Other tests were made in which the zinc oxide was mixed directly with the droppings in amounts of 0.005 gram to 1.0 gram per hundred grams of droppings. Zinc oxide in amounts of 0.010 or more grams per 100 grams of dropping inhibited the development of horn fly larvae.

Having thus described my invention, what I claim for Letters Patent is:

The method of controlling larvae which breed in animal droppings comprising adding to the feed of the animal zinc oxide.

WESLEY G. BRUCE.